United States Patent [19]

Trepka et al.

[11] Patent Number: 5,256,736
[45] Date of Patent: Oct. 26, 1993

[54] TAPERED BLOCK COPOLYMERS OF CONJUGATED DIENES AND MONOVINYLARENES

[75] Inventors: William J. Trepka; George A. Moczygemba; Ralph C. Farrar, Jr., all of Bartlesville, Okla.

[73] Assignee: Phillips Petroleum Company, Bartlesville, Okla.

[21] Appl. No.: 697,130

[22] Filed: May 8, 1991

[51] Int. Cl.$^5$ .......................................... C08F 297/04
[52] U.S. Cl. .................................. 525/314; 525/250; 525/271
[58] Field of Search .................. 525/314, 271, 250

[56] References Cited

U.S. PATENT DOCUMENTS

| | | | |
|---|---|---|---|
| 3,639,517 | 2/1972 | Kitchen et al. | 525/92 |
| 4,086,298 | 4/1978 | Fahrbach et al. | 525/314 |
| 4,089,913 | 5/1978 | Miki et al. | 525/272 |
| 4,180,530 | 12/1979 | Bi et al. | 525/98 |
| 4,248,981 | 2/1981 | Milkovich et al. | 525/271 |
| 4,248,984 | 2/1981 | Bi et al. | 525/314 |
| 4,390,663 | 6/1983 | Nicholson | 525/314 |
| 4,704,434 | 11/1987 | Kitchen et al. | 525/250 |
| 5,130,377 | 7/1992 | Trepka et al. | 525/314 |

Primary Examiner—James J. Seidleck
Assistant Examiner—M. L. Warzel
Attorney, Agent, or Firm—Morrison Bennett

[57] ABSTRACT

A method for preparing tapered block copolymers in a polymerization process by sequentially charging: (1) an initiator and monovinylaromatic monomers in the presence of a randomizer; (2) an initiator and a mixture of monovinylaromatic and conjugated diene monomers; (3) an initiator and a mixture of monovinylaromatic and conjugated diene monomers; and (4) a coupling agent to produce a polymodal tapered block copolymer. The copolymers are particularly useful for packaging applications which require good environmental stress crack resistance.

17 Claims, No Drawings

TAPERED BLOCK COPOLYMERS OF CONJUGATED DIENES AND MONOVINYLARENES

BACKGROUND OF THE INVENTION

This invention relates to tapered block copolymers of conjugated dienes and monovinylarenes.

In another aspect, this invention relates to a method of preparing tapered block copolymers of conjugated dienes and monovinylarenes.

There has developed in the polymer field, and especially in the packaging and related industries, a need for thermoplastic polymers that can be formed into transparent articles having high impact strength with good environmental stress crack resistance. These should be suitable for use with conventional injection and blow molding equipment and also suitable for use in other methods of forming plastics into containers, tubes, films, fibers, and the like. Polystyrene, high impact polystyrene, branched block copolymers, and the like have been developed to meet these criteria with various degrees of satisfaction.

Much effort has been directed to the preparation of substantially transparent block copolymer resins with a variety of block structures produced by a variety of monomer addition sequences and a variety of coupling agents.

Polymerization of styrene and butadiene with organolithium initiators to produce block copolymers in which one or more non-elastomeric polymer blocks are bonded to one or more elastomeric polymer blocks has been disclosed. Similarly, styrene-butadiene block copolymers with tapered blocks have been prepared by sequential charging of initiator and monomers to the polymerization zone. Block copolymers have been formed by sequential charges of the monomers followed by introduction of one or more coupling agents into the reaction.

Literally thousands of various combinations of sequences of charges of monomers and coupling agents are possible.

SUMMARY OF THE INVENTION

It is an object of this invention to provide a novel tapered block copolymer of conjugated dienes and vinyl-substituted aromatic hydrocarbons with improved environmental stress crack resistance.

A further object of this invention is to provide a novel process for making tapered block copolymers.

The inventive copolymers are prepared by:

(1) charging a monovinylaromatic monomer and an initiator in the presence of a randomizer and allowing polymerization to occur until essentially no free monomer is present; thereafter (2) charging an initiator and a mixture of monovinylaromatic monomer and conjugated diene monomer and allowing polymerization to occur until essentially no free monomer is present; thereafter (3) charging an initiator and a mixture of monovinylaromatic monomer and conjugated diene monomer and allowing polymerization to occur until essentially no free monomer is present; thereafter (4) charging the reaction mixture with a coupling agent.

DETAILED DESCRIPTION OF THE INVENTION

The polymers of this invention are characterized as resinous, polymodal block copolymers of at least one conjugated diene with at least one monovinylarene, having at least two random-tapered blocks and are prepared so that, when the choice of coupling agent permits, at least a portion of the final product is of a branched coupled character.

The copolymers contain about 55 to 95, preferably 60 to 90, more preferably 65 to 85, percent by weight of copolymerized monovinyl aromatic compound (monovinylarene), and correspondingly about 45 to 5, 40 to 10, or 35 to 15 percent by weight of copolymerized conjugated diene. The coupled portions of the resinous, polymodal block copolymers have terminal polymonovinylarene blocks on the extending arms of each linear or radial copolymer molecule, and further contain one or more central internal tapered blocks of monovinylarene and conjugated diene. The resinous copolymeric polymodal products also contain portions of linear uncoupled block copolymers of poly(monovinylarene)-poly(conjugated diene); the linear uncoupled block copolymer content is considered to be an important portion of the resinous product with respect to its overall properties.

The unique tapered block character of the polymer is produced by an initial charge of monovinylaromatic monomer and initiator, followed by two separate charges of initiator and mixtures of monovinylaromatic monomer and conjugated diene. At each stage of charging, polymerization is allowed to continue until essentially no free monomer is present.

With each subsequent charge which includes initiator a different molecular weight species will be produced as well as the opportunity for polymerization of part of the charge with each of the existing species. After virtually complete polymerization of the final charge, the active living linear block copolymers are charged with a polyfunctional coupling agent to allow coupling of each of the living species with each of the other species or with others of the same species to form the desired polymodal tapered block polymers.

The charging sequence of this invention, and the resulting polymers at each stage, is shown in the following table.

TABLE I

| | Charging Sequence | |
|---|---|---|
| Charge | Contents of Charge | Resulting Polymer Chains |
| (1) | randomizer, initiator$_1$ and styrene$_1$ | S$_1$—Li$_1$ |
| (2) | initiator$_2$, butadiene$_1$ and styrene$_2$ | S$_1$—B$_1$/S$_2$—Li$_1$<br>B$_1$/S$_2$—Li$_2$ |
| (3) | initiator$_3$, butadiene$_2$ and styrene$_3$ | S$_1$—B$_1$/S$_2$—B$_2$/S$_3$—Li$_1$<br>B$_1$/S$_2$—B$_2$/S$_3$—Li$_2$<br>B$_2$/S$_3$—Li$_3$ |
| (4) | Epoxidized Vegetable Oil | polymodal tapered block polymers with styrene terminal blocks | where S = styrene
B = butadiene
B/S = tapered block
and where the randomizer is usually added with the diluent initially charged to the reactor.

Tapered blocks in each of the growing polymer chains are produced by simultaneously charging with both monomers as in the second and third steps shown above in the table of the inventive charging sequence. As can be seen from the intermediate products listed in the charging sequence table above, there are at least three distinct polymer chains before coupling. Thus, polymodal block copolymers comprising high, medium and low molecular weight species are produced. The randomizer causes random polymerization of the monovinylaromatic monomer and the conjugated diene, but the diene still enters into the chain faster than the monovinyl substituted aromatic so that the block tapers gradually from a random copolymer block to an essentially monovinyl substituted aromatic block. Prior to coupling, all of the polymer chains have monovinylaromatic terminal blocks.

The process of this invention can be carried out with any of the organomonoalkali metal compounds of the formula RM wherein R is an alkyl, cycloalkyl or arylcarbanion containing 4 to 8 carbon atoms and M is an alkyl metal cation. The presently preferred initiators are alkylmonolithium compounds, especially n-butyllithium or sec-butyllithium.

The conjugated diene monomers which can be used contain 4 to 6 carbon atoms and include 1,3-butadiene, 2-methyl-1,3-butadiene, 2-ethyl-1,3-butadiene, 2,3-dimethyl-1,3-butadiene and 1,3-pentadiene and mixtures thereof. Presently preferred is 1,3-butadiene.

The monovinylaromatic monomers which can be used contain 8 to 12 carbon atoms and include styrene, alpha-methylstyrene, 4-methylstyrene, 3-methylstyrene, 2-methylstyrene, 4-ethylstyrene, 3-ethylstyrene, 2-ethylstyrene, 4-tertbutylstyrene, 2,4-dimethylstyrene and condensed aromatics such as vinyl naphthalene and mixtures thereof. Presently preferred is styrene.

The polymerization process is carried out in a hydrocarbon diluent at any suitable temperature in a range of $-10°$ to $150°$ C., preferably in the range of $0°$ to $110°$ C., at pressures sufficient to maintain the reaction mixture substantially in the liquid phase. Preferred hydrocarbon diluents include linear and cycloparaffins such as butane, pentane, hexane, octane, cyclohexane, cyclopentane and mixtures thereof. Presently preferred is cyclohexane. Generally the temperature is such that the resulting polymer is in solution.

Small amounts of polar compounds are used in the hydrocarbon diluent to improve the effectiveness of alkylmonoalkali metal initiators such as n-butyllithium and to effect partial randomization of the vinylarene/-conjugated diene so as to increase the random portion of the tapered block. Examples of polar compounds which can be advantageously employed are ethers, thioethers (sulfides) and tertiary amines. It is usually preferred to use ethers and sulfides in which the radicals attached to the oxygen or sulfur atoms are hydrocarbon radicals. Specific examples of such polar materials include dimethyl ether, diethyl ether, ethyl methyl ether, ethyl propyl ether, di-n-propyl ether, di-n-octyl ether, anisole, dioxane, 1,2-dimethoxyethane, dibenzyl ether, diphenyl ether, 1,2-dimethoxybenzene, tetramethylene oxide (tetrahydrofuran), dimethyl sulfide, diethyl sulfide, di-n-propyl sulfide, di-n-butyl sulfide, methyl ethyl sulfide, dimethylethylamine, tri-n-ethylamine, tri-n-propylamine, tri-n-butylamine, trimethylamine, triethylamine, tetramethylethylenediamine, tetraethylethylenediamine, N,N-di-methylaniline, N-methyl-N-ethylaniline, N-methylmorpholine, and the like. It is to be understood also that mixtures of these polar compounds can be employed in the practice of the present invention. The polar compounds are generally used in admixture with the hydrocarbon diluent. Presently preferred are either tetrahydrofuran or diethyl ether.

The initial monovinylaromatic charge is made with the randomizer present for the additional effect of causing the monovinylaromatic component resulting from each initiator charge to be of relatively narrow molecular weight distribution. By varying the amounts of initiator in each of the three charges having initiator the differences in molecular weights of the monovinylaromatic components resulting from each of the three charges can be increased. Surprisingly, superior results are obtained by having the monovinylaromatic components resulting from each initiator charge be of relatively narrow molecular weight distribution while having a relatively broad molecular weight distribution in the polymodal polymer.

The polymerization is carried out in a substantial absence of oxygen and water, preferably under an inert gas atmosphere. Prior to the coupling step, the reaction mass contains a very high percentage of molecules (polymer chains) in which an alkali metal cation is positioned at one end of each polymer chain. Impurities in the feed such as water or alcohol reduce the amounts of monoalkali metal polymer in the reaction mass.

After virtually complete polymerization of the final charge added to the polymer, a suitable polyfunctional coupling agent is added. As used here, the term "coupling" means the bringing together and joining, by means of one or more central coupling atoms or coupling moieties, two or more of the living monoalkali metal-terminated polymer chains. A wide variety of compounds for such purposes can be employed.

Among the suitable coupling agents are the di- or multivinylaromatic compounds, di- or multiepoxides, di- or multiisocyanates, di- or multiimines, di- or multialdehydes, di- or multiketones, di- or multihalides, particularly silicon halides and halosilanes, mono-, di-, or multianhydrides, mono-, di-, or multiesters, preferably the esters of monoalcohols with polycarboxylic acids, diesters which are esters of monohydric alcohols with dicarboxylic acids, lactones, and the like, including combination type compounds containing two or more groups and mixtures.

Examples of suitable vinylaromatic coupling agents include, but are not limited to, divinylbenzene, 1,2,4-trivinylbenzene, 1,3-divinylnaphthalene, 1,3,5-trivinylnaphthalene, 2,4-divinylbiphenyl, p-diisopropenylbenzene, and the like. Of these, the divinylaromatic hydrocarbons are preferred, particularly divinylbenzene in either its ortho, meta, or para isomer. Commercial divinylbenzene which is a mixture of the three isomers and other compounds is satisfactory.

Epoxidized hydrocarbon polymers such as epoxidized liquid polybutadiene and the epoxidized vegetable oils such as epoxidized soybean oil and epoxidized linseed oil, and epoxy compounds such as 1,2; 5,6; 9,10-triepoxydecane, and the like, can be used.

Organoalkyl phosphites and arylalkyl phosphites are considered useful as coupling agents in this invention.

Examples of suitable multiisocyanates include benzene-1,2,4-triisocyanate, naphthalene-1,2,5,7-tetraisocyanate, and the like. Commercially available products known as PAPI-1, a polyarylpolyisocyanate having an average of 3 isocyanate groups per molecule and an average molecular weight of about 380 are suitable.

The multiimines, also known as multiaziridinyl compounds, such as those containing 3 or more aziridine rings per molecule, are useful. Other compounds useful as coupling agents include tetravinyl silane, trivinyl phosphine, the triaziridinyl phosphine oxides or sulfides such as tri(1-aziridinyl)phosphine oxide, tri(2-methyl-1-aziridinyl)-phosphine oxide, tri(2-ethyl-3-decyl-1-aziridinyl)phosphine sulfide, and the like.

The multialdehydes are represented by compounds such as 1,4,7-naphthalenetricarboxyaldehyde, 1,7,9-anthracenetricarboxyaldehyde, 1,1,5-pentanetricarboxyaldehyde, and similar multialdehyde-containing aliphatic and aromatic compounds. The multiketones are represented by compounds such as 1,4,9,10-anthracenetetrone, 2,3-diacetonylcyclohexanone, and the like. Examples of the multianhydrides include pyromellitic dianhydride, styrene-maleic anhydride copolymers, and the like. Examples of the multiesters include diethyladipate, triethylcitrate, 1,3,5-benzenetricarboxylic acid, triethyl ester, and the like.

Among the multihalides are the silicon tetrahalides such as silicon tetrachloride, silicon tetrabromide, and silicon tetraiodide; the trihalosilanes such as trifluorosilane, trichlorosilane, trichloroethylsilane, tribromobenzylsilane, and the like; and the multihalogen-substituted hydrocarbons, such as 1,3,5-tri(bromomethyl)benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogens as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2; 4,5-diepoxy-3-hexanone, 1,2; 11,12-diepoxy-8-pentadecanone, 1,3; 18,19-diepoxy-7,14-eicosanedione, and the like.

Other metal multihalides, particularly those of tin, lead, or germanium, can be employed as coupling and branching agents. Silicon or other metal multialkoxides, such as silicon tetraethoxide, are also suitable coupling agents.

The presently preferred coupling agent is epoxidized vegetable oil. Most preferred is epoxidized soybean oil.

Any effective amount of the coupling agent can be employed. While the amount is not believed to be particularly critical, a stoichiometric amount relative to the active polymer-alkali metal tends to promote maximum coupling as a generality. Presently preferred is an amount of coupling agent slightly greater than stoichiometric relative to the active polymer-alkali metal. However, less than stoichiometric amounts can be used for lesser degrees of coupling where desired for particular products of broadened molecular weight.

Typically, the total amount of coupling agent is in the range of about 0.1 to 20 mhm (gram millimoles per 100 grams of total monomers employed in the polymerization). Presently preferred is about 0.3 to about 0.5 phm.

At the conclusion of the coupling process, the system is treated with an active hydrogen compound such as water, alcohol, phenols or linear saturated aliphatic mono- and dicarboxylic acids to remove the lithium from the polymer. Preferably, the polymer cement, i.e. the polymer and the polymerization solvent, is treated with terminating agents such as water and carbon dioxide and then antioxidants.

The resins can then be stabilized with a combination of a hindered phenol and an organophosphite, specifically, octadecyl 3-(3′,5′-di-t-butyl-4′-hydroxyphenyl) propionate and tris-nonylphenylphosphite. After stabilization, the hydrocarbon diluent is then flashed off the polymer solution to increase the solids content.

In charges (1), (2) and (3) referred to in the Summary of the Invention above, the weight percentages of monovinylaromatic monomer as a percent of the total monovinylaromatic monomer charged are as shown in the following Table II.

TABLE II

| Amounts of Monovinylaromatic Monomer in Each Charge | | | |
|---|---|---|---|
| | Broad Range | Preferred Range | More Preferred Range |
| Total Styrene[a] | 55–95 | 60–90 | 65–85 |
| $S_1$, wt. %[b] | 10–70 | 15–65 | 20–60 |
| $S_2$, wt. %[b] | 10–30 | 11–26 | 12–23 |
| $S_3$, wt. %[b] | 10–30 | 11–26 | 12–23 |

[a]Weight percent, based on total weight of the copolymer.
[b]Based on total weight of styrene charged to the copolymer.

The weight ratio of monovinyl substituted aromatic monomer to conjugated diene monomer in charges (2) and (3) is from about 1:0.63 to about 1:2, preferably from about 1:0.67 to about 1:1.8, and more preferably from about 1:0.8 to about 1:1.5.

Generally each of the two tapered blocks made in steps (2) and (3) should be of about equal size; however, actual sizes of the two tapered blocks can vary within the same copolymer depending upon the amounts of monovinylaromatic monomer charged in the second and third charges ($S_2$ and $S_3$).

The amounts of polar compounds used as randomizers in this invention will vary according to the reactivity and effectiveness of the particular randomizer used. For example, 1,2-dimethoxymethane, tetramethylethylenediamine and 1,2-dimethoxybenzene are much more efficient randomizers than most of the others listed above when used with the particular initiators and monomers used in the invention runs described below. However, tetrahydrofuran is often used because the reaction will go on to nearer completion in a shorter time after the initial reaction in the monomer rich environment. Also, there are dramatic variations in the amounts of each of these most efficient randomizers which will be needed. For example, for polymerizations such as those shown in the examples of invention runs in Table VII of this application, about three and a half times as much tetrahydrofuran as 1,2-dimethoxyethane would be needed.

The amounts of polar compounds used as randomizers will also vary according to the desired molecular structure of the portions of tapered blocks which result from conjugated diene addition. For example, it has been observed that in reactions such as those shown in the invention runs listed in Table VII, 1,4 addition of butadiene significantly exceeds 1,2 addition of butadiene when about 1.75 parts tetrahydrofuran per hundred parts total monomers is used in each of the charges which includes randomizer. When it is desirable that the tapered blocks of the polymer have more nearly equal amounts of 1,4 addition of butadiene and 1,2 addition of butadiene or only a little more 1,4 addition than 1,2 addition of butadiene, as much as 2.5 phm of tetrahydrofuran can be used.

Generally, when tetrahydrofuran is used as a randomizer and it is desired that 1,4 addition occur in excess of 1,2 addition, then the amounts needed are as shown in Table III.

TABLE III

Example of Useful Amounts of Randomizer when THF is Used for Major 1,4 Addition and Minor 1,2 Conjugated Diene Addition

| Range | phm[a] | mhm[b] |
|---|---|---|
| Broad | 0.001 to 0.10 | 0.014 to 1.39 |
| Preferred | 0.005 to 0.085 | 0.069 to 1.18 |
| Most Preferred | 0.015 to 0.060 | 0.208 to 0.833 |

[a] phm is parts per hundred parts total monomers.
[b] mhm is gram-millimoles per hundred grams of total monomers.

When polymers with higher vinyl character are desired, then the useful amounts of tetrahydrofuran needed would be larger, perhaps as much as 2.5 phm.

The amount of initiator contemplated as useful in each of the three charges having initiator is shown in Table IV.

TABLE IV

Amounts of Initiator in Each Charge

| Charge | Units | Broad Range | Preferred Range | More Preferred Range |
|---|---|---|---|---|
| $L_1$ | phm[a] | 0.005–1.5 | 0.01–1.0 | 0.050–0.1 |
|  | mhm[b] | 0.078–23.4 | 0.156–15.6 | 0.781–1.56 |
| $L_2$ | phm | 0.005–1.5 | 0.01–1.0 | 0.05–0.1 |
|  | mhm | 0.078–23.4 | 0.156–15.6 | 0.781–1.56 |
| $L_3$ | phm | 0.010–3.0 | 0.02–2.0 | 0.04–0.15 |
|  | mhm | 0.156–46.8 | 0.312–31.2 | 0.625–2.34 |

[a] phm is parts per hundred parts total monomer.
[b] mhm is gram-millimoles per hundred grams of total monomers.

The ratio of the amounts of initiator in the three charges containing initiator can be represented as $$Li_1:Li_2:Li_3::1:1 \text{ to } 1.2:2 \text{ to } 5$$

wherein
$Li_1$ = initiator in the first charge
$Li_2$ = initiator in the second charge
$Li_3$ = initiator in the third charge.

The initiator, when used in appropriate amounts, effectively improves environmental stress crack resistance.

The amounts of initiators are selected such that the amount in the second charge is at least equal to or slightly greater than that employed in the first charge. The amounts used in the third charge should be about 1.5 to 5 times greater than that employed in the second charge.

Varying the ratios of the initiator charges will result in variations of the proportionate amounts of species present in the copolymer. While not wishing to be bound by theory, the inventors believe that when, for example, the first, second and third initiator charges are made in a 1:1:3 ratio and a difunctional coupling agent is used, the following polymer species are present in the inventive copolymer in the relative amounts indicated.

TABLE V

Proportionate Amounts of Species Present in Copolymer with Difunctional Coupling

| Species | Relative Amount |
|---|---|
| $S_1$—$B_1/S_2$—$B_2/S_3$—x—$S_3/B_2$—$S_2/B_2$—$S_1$ | 1 |
| $S_1$—$B_1/S_2$—$B_2/S_3$—x—$S_3/B_2$—$S_2/B_1$ | 1 |
| $S_1$—$B_1/S_2$—$B_2/S_3$—x—$S_3/B_2$ | 3 |
| $B_1/S_2$—$B_2/S_3$—x—$S_3/B_2$—$S_3/B_1$ | 1 |
| $B_1/S_2$—$B_2/S_3$—x—$S_3/B_2$ | 3 |
| $B_2/S_3$—x—$S_3/B_2$ | 6 | where S represents monovinylarene blocks
B/S represents tapered conjugated diene/monovinylarene blocks
x represents residual coupling agent or coupling site
and the subscripts are indications of the charges which were the source of the polymer blocks (see Table I and accompanying explanation).

While additional charges, with or without initiator are possible, the process preferably consists essentially of the three charges plus coupling step set out above.

TEST PROCEDURE

The environmental stress crack resistance potential of the block copolymers was determined in an accelerated test referred to as the Puncture Test. Test specimens about 2 inches square were cut from an interior layer about 0.015 inches thick from a coil or roll of extruded sheet. The side of the film or sheet facing away or furtherest from the center of the coil or roll, of course, must "stretch" or cover more distance than the side closest to the center of the coil or roll. Results obtained from the outside part of a rolled layer are termed "curl down" and those from the inside part are termed "curl up".

Each specimen was clamped over a hole about 1 inch in diameter and 4 drops of soybean oil was placed on the specimen over the hole. A rounded tipped stainless steel rod about ¼ inch in diameter was weighted with a 2 kg load and brought into contact with the specimen. The time to failure in minutes was recorded. Ten specimens of each run were tested and the results were averaged.

The puncture test results appear to correlate well with actual environmental stress crack resistance test results and are obtained much more quickly.

The following examples will describe in more detail the experimental process used and the polymodal tapered block copolymers with vinylarene terminal blocks obtained as a result of the process.

EXAMPLE I

Polymerization runs were carried out under nitrogen in a stirred, jacketed, stainless steel reactor of two and one third gallon capacity employing essentially anhydrous reactants and conditions. In each of four runs (1A, 1B, 1C and 1D), 1500 g total monomers were charged and the reactor each time was charged with 4.8 lbs (2177 g) of cyclohexane, about 68 weight percent of the total amount of diluent was charged with the initial styrene charge. The remaining 32 weight percent was added during the run as diluent or flush for the various reactants added in subsequent steps. The diluent, containing 0.04 phm tetrahydrofuran (THF), was preheated to about 50° C. before charging to the reactor.

The charges used and the results obtained are summarized in Table VI. In each of the steps in which both butadiene and styrene were charged, they were charged simultaneously as a mixture. Following stabilization, each polymer solution was flashed at 178° C. to remove a portion of the diluent. Substantially all of the remaining diluent was subsequently removed in a vacuum oven or in a devolatilizing extruder as is known in the art.

The resins recovered from runs 1A, 1B, 1C and 1D were blended together. The composite had a melt flow of 6.5 g/10 min. The components charged in the runs of this example and the results obtained are summarized in Table VI.

TABLE VI

Invention Runs
Polymodal, Coupled, Tapered Block Copolymers
with Terminal Resinous Blocks

| Components[a] | Run 1A | Run 1B | Run 1C | Run 1D |
|---|---|---|---|---|
| Step 1 | | | | |
| $NBL_1$, phm | 0.030 | 0.030 | 0.030 | 0.030 |
| $S_1$, phm | 40.0 | 40.0 | 40.0 | 40.0 |
| Polymerization Time, minutes | 12 | 12 | 12 | 12 |
| Peak Polymerization Temperature, °C. | 82 | 82 | 75 | 75 |
| Step 2 | | | | |
| $NBL_2$, phm | 0.030 | 0.030 | 0.030 | 0.030 |
| $S_2$, phm | 15 | 15 | 15 | 15 |
| $B_1$, phm | 15 | 15 | 15 | 15 |
| Polymerization Time, minutes | 40 | 40 | 40 | 40 |
| Peak Polymerization Temperature, °C. | 91 | 89 | 76 | 71 |
| Step 3 | | | | |
| $NBL_3$, phm | 0.090 | 0.085 | 0.089 | 0.088 |
| $S_3$, phm | 15 | 15 | 15 | 15 |
| $B_2$, phm | 15 | 15 | 15 | 15 |
| Polymerization Time, minutes | 40 | 40 | 40 | 40 |
| Peak Polymerization Temperature, °C. | 107 | 106 | 95 | 86 |
| Step 4 (Coupling)[b] | | | | |
| Vikoflex 7170, phm | 0.40 | 0.40 | 0.40 | 0.40 |
| Time, minutes | 16 | 16 | 16 | 16 |
| Temperature, °C. | 91 | 92 | 90 | 85 |
| Step 5 (Terminating)[c] | | | | |
| Water, phm | 0.2 | 0.2 | 0 2 | 0.2 |
| Carbon Dioxide, phm | 0.4 | 0.4 | 0.4 | 0.4 |
| Time, minutes (Total) | 25 | 25 | 25 | 25 |
| Temperature, °C. | 85 | 78 | 78 | 84 |
| Step 6 (Stabilizing)[d] | | | | |
| Stabilizer Mixture, phm | 1.25 | 1.25 | 1.25 | 1.25 |
| Time, minutes | 5 | 5 | 5 | 5 |
| Temperature, °C. | 83 | 78 | 78 | 84 |
| Recovered Resin | | | | |
| Melt Flow, g/10 minutes | 7.9 | 5.6 | 7.2 | 6.7 |

[a]The symbols NBL, S and B, represent, respectively, n-butyllithium initiator, styrene and butadiene. The subscript numbers refer to the numerical order in which that compound was used.
[b]The coupling agent, Vikoflex 7170, is an epoxidized vegetable oil, commercially available from Viking Chemical Company.
[c]The source of the carbon dioxide was from a pressurized container. Enough was carefully admitted to provide about 0.4 phm.
[d]Each stabilizer was dissolved in separate dilute cyclohexane solution. The hindered phenol and organic phosphite used have been previously described. A sufficient amount of each solution was mixed together and the mixture added to the reactor to provide 0.25 phm hindered phenol and 1 phm organic phosphite.

EXAMPLE II

Polymerization runs were carried out in the manner generally described in Example I for control runs 1 and 2. Control run 3 differed in that the reactor was initially charged with 8.2 lbs (3720 g) cyclohexane, about 79 weight percent of the total amount of cyclohexane used. The remaining 21 weight percent was added as diluent or flush for the various reactants subsequently added. The initial 8.2 lb. charge of diluent corresponded to 248 phm based on the 1500 g charge of total monomers added. The difference in diluent content is not thought to be significant in the results obtained. Control 3 also differed from invention runs 1A, 1B, 1C and 1D and control runs 1 and 2 in that 2 initiator charges were employed compared to the 3 initiator charges used in the other runs of this example.

The charges used and the results obtained are summarized in Tables VIIA, B and C. Again, as in the runs in Example I, in each of the steps in which both butadiene and styrene were charged, they were charged simultaneously as a mixture.

Following stabilization and flashing at 178° C., each resin was isolated and blended as before. The melt flows of the various composites obtained were as follows:
Invention (Runs 1A, 1B, 1C and 1D); 6.5 g/10 min.
Control 1 (Runs 2A, 2B, 2C and 2D); 7.2 g/10 min.
Control 2 (Runs 3A, 3B, 3C and 3D); 7.7 g/10 min.
Control 3 (Runs 4A, 4B, 4C and 4D); 6.6 g/10 min.

TABLE VIIA

Control 1
Polymodal, Coupled, Tapered Block Copolymers
with Terminal Resinous Blocks

| Components[a] | Run 2A | Run 2B | Run 2C | Run 2D |
|---|---|---|---|---|
| Step 1 | | | | |
| $NBL_1$, phm | 0.030 | 0.030 | 0.030 | 0.030 |
| $S_1$, phm | 40.1 | 40.1 | 40.1 | 40.1 |
| Polymerization Time, minutes | 12 | 12 | 12 | 12 |
| Peak Polymerization Temperature, °C. | 83 | 85 | 82 | 76 |
| Step 2 | | | | |
| $NBL_2$, phm | 0.030 | 0.030 | 0.030 | 0.030 |
| $B_1$, phm | 8 | 8 | 8 | 8 |
| $S_2$, phm | 19.7 | 19.7 | 19.7 | 19.7 |
| Polymerization Time, minutes | 40 | 40 | 40 | 40 |
| Peak Polymerization Temperature, °C. | 86 | 86 | 87 | 79 |
| Step 3 | | | | |
| $NBL_3$, phm | 0.050 | 0.050 | 0.050 | 0.050 |
| $B_2$, phm | 17.5 | 17.5 | 17.5 | 17.5 |
| $S_3$, phm | 14.6 | 14.6 | 14.6 | 14.6 |
| Polymerization Time, minutes | 40 | 40 | 40 | 40 |
| Peak Polymerization Temperature, °C. | 106 | 106 | 109 | 100 |
| Step 4 (Coupling)[b] | | | | |
| Vikoflex 7170, phm | 0.40 | 0.40 | 0.40 | 0.40 |
| Time, minutes | 16 | 16 | 16 | 16 |
| Temperature, °C. | 90 | 88 | 90 | 95 |
| Step 5 (Terminating)[c] | | | | |
| Water, phm | 0.2 | 0.2 | 0.2 | 0.2 |
| Carbon Dioxide, phm | 0.4 | 0.4 | 0.4 | 0.4 |
| Time, minutes (Total) | 25 | 25 | 25 | 25 |
| Temperature, °C. | 88 | 82 | 85 | 85 |
| Step 6 (Stabilizing)[d] | | | | |
| Stabilizer Mixture, phm | 1.25 | 1.25 | 1.25 | 1.25 |
| Time, minutes | 5 | 5 | 5 | 5 |
| Temperature, °C. | 87 | 83 | 85 | 88 |
| Recovered Resin | | | | |
| Melt Flow, g/10 minutes | 7.3 | 6.8 | 7.1 | 7.5 |

[a]The symbols NBL, S and B, represent, respectively, n-butyllithium initiator, styrene and butadiene. The subscript numbers refer to the numerical order in which that compound was used.
[b]The coupling agent, Vikoflex 7170, is an epoxidized vegetable oil, commercially available from Viking Chemical Company.
[c]The source of the carbon dioxide was from a pressurized container. Enough was carefully admitted to provide about 0.4 phm.
[d]Each stabilizer was dissolved in separate dilute cyclohexane solution. The hindered phenol and organic phosphite used have been previously described. A sufficient amount of each solution was mixed together and the mixture added to the reactor to provide 0.25 phm hindered phenol and 1 phm organic phosphite.

TABLE VIIB

Control 2
Polymodal, Coupled, Block Copolymers with Terminal Rubbery Blocks

| Components[a] | Run 3A | Run 3B | Run 3C | Run 3D |
|---|---|---|---|---|
| Step 1 | | | | |
| $NBL_1$, phm | 0.030 | 0.030 | 0.030 | 0.030 |
| $S_1$, phm | 40.1 | 40.1 | 40.1 | 40.1 |
| Polymerization Time, minutes | 12 | 12 | 12 | 12 |
| Peak Polymerization Temperature, °C. | 79 | 80 | 81 | 85 |
| Step 2a | | | | |
| $NBL_2$, phm | 0.030 | 0.030 | 0.030 | 0.030 |
| $S_2$, phm | 19.7 | 19.7 | 19.7 | 19.7 |
| Polymerization Time, minutes | 12 | 12 | 12 | 12 |
| Peak Polymerization Temperature, °C. | 77 | 76 | 76 | 76 |
| Step 2b | | | | |
| $B_1$, phm | 8 | 8 | 8 | 8 |
| Polymerization Time, minutes | 16 | 16 | 16 | 16 |
| Peak Polymerization Temperature, °C. | 79 | 72 | 72 | 72 |
| Step 3a | | | | |
| $NBL_3$, phm | 0.108 | 0.108 | 0.108 | 0.108 |
| $S_3$, phm | 14.6 | 14.6 | 14.6 | 14.6 |
| Polymerization Time, minutes | 12 | 12 | 12 | 12 |
| Peak Polymerization Temperature, °C. | 79 | 94 | 92 | 81 |
| Step 3b | | | | |
| $B_2$, phm | 17.5 | 17.5 | 17.5 | 17.5 |
| Polymerization Time, minutes | 16 | 16 | 16 | 16 |
| Peak Polymerization Temperature, °C. | 94 | 95 | 95 | 94 |
| Step 4 (Coupling)[b] | | | | |
| Vikoflex 7170, phm | 0.39 | 0.39 | 0.39 | 0.39 |
| Time, minutes | 16 | 16 | 16 | 16 |
| Temperature, °C. | 84 | 81 | 80 | 86 |
| Step 5 Terminating[c] | | | | |
| Water, phm | 0.2 | 0.22 | 0.22 | 0.22 |
| Carbon Dioxide, phm | 0.4 | 131 | 131 | 131 |
| Time, minutes (Total) | 25 | 25 | 25 | 25 |
| Temperature, °C. | 81 | 81 | 85 | 86 |
| Step 6 (Stabilizing)[d] | | | | |
| Stabilizer Mixture, phm | 1.25 | 1.25 | 1.25 | 1.25 |
| Time, minutes | 5 | 5 | 5 | 5 |
| Temperature, °C. | 88 | 82 | 83 | 82 |
| Recovered Resin | | | | |
| Melt Flow, g/10 minutes | 6.4 | 7.2 | 7.7 | 6.7 |

[a]The symbols NBL, S and B, represent, respectively, n-butyllithium initiator, styrene and butadiene. The subscript numbers refer to the numerical order in which that compound was used.
[b]The coupling agent, Vikoflex 7170, is an epoxidized vegetable oil, commercially available from Viking Chemical Company.
[c]The source of the carbon dioxide was from a pressurized container. Enough was carefully admitted to provide about 0.4 phm.
[d]Each stabilizer was dissolved in separate dilute cyclohexane solution. The hindered phenol and organic phosphite used have been previously described. A sufficient amount of each solution was mixed together and the mixture added to the reactor to provide 0.25 phm hindered phenol and 1 phm organic phosphite.

TABLE VIIC

Control 3
Polymodal, Coupled, Tapered Block Copolymers with Terminal Resinous Blocks

| Components[a] | Run 4A | Run 4B | Run 4C | Run 4D |
|---|---|---|---|---|
| Step 1 | | | | |
| $SBL_1$, phm | 0.062 | 0.065 | 0.065 | 0.065 |
| $S_1$, phm | 40 | 40 | 40 | 40 |
| Polymerization Time, minutes | 12 | 12 | 12 | 12 |
| Peak Polymerization Temperature, °C. | 56 | 60 | 60 | 63 |
| Step 2 | | | | |
| $SBL_2$, phm | 0.081 | 0.084 | 0.084 | 0.084 |
| $S_2$, phm | 30 | 30 | 30 | 30 |
| $B_1$, phm | 30 | 30 | 30 | 30 |
| Polymerization Time, minutes | 40 | 40 | 40 | 40 |
| Peak Polymerization Temperature, °C. | 78 | 80 | 88 | 92 |
| Step 3 (Coupling)[b] | | | | |
| Vikoflex 7170, phm | 0.40 | 0.40 | 0.40 | 0.40 |
| Time, minutes | 16 | 16 | 16 | 16 |
| Temperature, °C. | 93 | 91 | 88 | 86 |
| Step 4 (Terminating)[c] | | | | |
| Water, phm | 0.2 | 0.2 | 0.2 | 0.2 |
| Carbon Dioxide, phm | 0.4 | 0.4 | 0.4 | 0.4 |
| Time, minutes (Total) | 25 | 25 | 25 | 25 |
| Temperature, °C. | 87 | 87 | 92 | 89 |
| Step 5 (Stabilizing)[d] | | | | |
| Stabilizer Mixture, phm | 1.25 | 1.25 | 1.25 | 1.25 |
| Time, minutes | 5 | 5 | 5 | 5 |
| Temperature, °C | 85 | 85 | 85 | 85 |
| Recovered Resin | | | | |
| Melt Flow, g/10 minutes | 4.9 | 6.9 | 7.2 | 5.9 |

[a]The symbols SBL, S and B, represent, respectively, sec-butyllithium
[b]The coupling agent, Vikoflex 7170, is an epoxidized vegetable oil, commercially available from Viking Chemical Company.
[c]The source of the carbon dioxide was from a pressurized container. Enough was carefully admitted to provide about 0.4 phm.
[d]Each stabilizer was dissolved in separate dilute cyclohexane solution. The hindered phenol and organic phosphite used have been previously described. A sufficient amount of each solution was mixed together and the mixture added to the reactor to provide 0.25 phm hindered phenol and 1 phm organic phosphite.

EXAMPLE III

This example compared the test properties of the invention copolymers as prepared by the procedure summarized in Table VI of Example I with those of the control copolymers as prepared by the procedures summarized in Tables VIIA, VIIB and VIIC of Example II. The comparative results are presented in Table VIII.

TABLE VIII

Comparison of Invention Copolymer with Control Copolymers

| Property | Invention Copolymer | Control 1 | Control 2 | Control 3 |
|---|---|---|---|---|
| Melt Flow[a], g/10 minutes | 6.5 | 7.2 | 7.7 | 6.6 |
| Weight Average Molecular Weight[b] ($M_w$) | 176,000 | 184,000 | 160,000 | 127,000 |
| Number Average Molecular Weight[b] ($M_n$) | 110,000 | 124,000 | 106,000 | 99,000 |
| Heterogeneity Index[c] ($M_w/M_n$) | 1.60 | 1.48 | 1.51 | 1.28 |
| Puncture Test[d] (Average of 10) | | | | |
| Curl Up, minutes | 57.9 | 3.05 | 6.04 | 0.23 |
| Curl Down, minutes | 41.0 | 4.96 | 8.20 | 0.26 |

TABLE VIII-continued

Comparison of Invention Copolymer with Control Copolymers

| Property | Invention Copolymer | Control 1 | Control 2 | Control 3 |
|---|---|---|---|---|
| Time to Crosslinking[e], minutes | 22.5 | 31 | 28 | 27 |
| Total Styrene[f], weight percent | 71.7 | 76.2 | 76.1 | 71.6 |
| Block Styrene[f], weight percent | 59.4 | 64.0 | 71.9 | 63.6 |
| Structure of High Molecular Weight Copolymer Before Coupling | S—B/S—B/S | S—B/S—B/S | S—S—B—S—B | S—B/S |
| Parts by Weight of Each Component in High Molecular Weight Copolymer | 40-15/15-15/15 | 40-8/19.7-17.5/14.6 | 40-19.7-8-14.6-17.5 | 40-30/30 |
| Number of Tapered Blocks | 2 | 2 | 0 | 1 |

[a]According to ASTM D1238, Condition G (200° C., 5 Kg load).
[b]Determined by gel permeation chromatography.
[c]The molecular weight distribution broadens as this ratio increases.
[d]As described in the specification. Higher numbers indicate more environmental stress crack resistance.

The data given in Table VIII clearly show the invention copolymer to be superior to all of the control copolymers in puncture resistance. As the time to failure in this test increases, the environmental stress crack resistance of the copolymer is believed to directly increase also. In comparing copolymers containing about the same total styrene charged, for example the invention copolymer and control copolymer 3, each containing about 72 weight percent styrene and each containing about the same amount of block styrene, the difference in puncture resistance is outstanding. Both copolymers have the desirable B/S weight ratio of 1:1. However, the invention copolymer is prepared with two B/S blocks whereas control 3 is prepared with one B/S block. The invention copolymer also differs from control 3 in that 3 initiator charges were employed in its preparation relative to the 2 initiator charges used in control 3. As a result its heterogeneity index value of 1.60 compared to the value of 1.28 for control 3 shows that the invention copolymer has a broader molecular weight distribution as a result of the polymodal copolymer species present in the mixture of copolymers formed in the coupling reaction. Control 1 has a total styrene content of about 76 weight percent and a block styrene content of about 64 weight percent. The puncture resistance of control 1 is unexpectedly low even though it was prepared in the same fashion as the invention copolymer and contains 2 tapered blocks. However, one tapered block contains less butadiene than that specified in this invention, e.g., a styrene to butadiene weight ratio of 1:0.4 as compared to the 1:0.63 styrene to butadiene ratio of this invention. The invention copolymer is lower in time to crosslinking as reflected in the results included in Table VIII. This can be improved to a higher value, if desired, by slightly increasing the stabilizer content. However, increasing stabilizer content is known to have little or no effect on environmental stress crack resistance.

That which is claimed is:

1. A method of preparing a polymer comprising:
   (1) charging a monovinylaromatic monomer and an initiator in the presence of a randomizer and allowing polymerization to occur until essentially no free monomer is present; thereafter
   (2) charging an initiator and a mixture of monovinylaromatic monomer and conjugated diene monomer, and allowing polymerization to occur until essentially no free monomer is present; thereafter
   (3) charging an initiator and a mixture of monovinylaromatic monomer and conjugated diene monomer, and allowing polymerization to occur until essentially no free monomer is present; and thereafter
   (4) charging the reaction mixture with a coupling agent.

2. A method according to claim 1 wherein said monovinylaromatic monomer contains 8 to 12 carbon atoms and said conjugated diene contains 4 to 6 carbon atoms, said monomers being added in a ratio of about 55 to 95 weight percent monovinylaromatic monomer and about 5 to about 45 weight percent conjugated diene monomer, thus giving a resinous tapered block copolymer.

3. A method according to claim 1 wherein said monovinylaromatic monomer contains 8 to 12 carbon atoms and said conjugated diene contains 4 to 6 carbon atoms, said monomers being added in a ratio of about 60 to 90 weight percent monovinylaromatic monomer and 10 to 40 weight percent conjugated diene monomer, thus giving a resinous tapered block copolymer.

4. A method according to claim 1 wherein said monovinylaromatic monomer contains 8 to 12 carbon atoms and said conjugated diene contains 4 to 6 carbon atoms, said monomers being added in a ratio of about 65 to 85 weight percent monovinylaromatic monomer and 15 to 35 weight percent conjugated diene monomer, thus giving a resinous tapered block copolymer.

5. A method according to claim 1 wherein the weight ratio of the amounts of said monovinylaromatic monomer and said conjugated diene monomer in steps (2) and (3) is within the range of about 1 to 0.63 to about 1 to 2.

6. A method according to claim 1 wherein the weight ratio of said monovinylaromatic monomer and said conjugated diene monomer in steps (2) and (3) is within the range of about 1:0.67 to about 1:1.8.

7. A method according to claim 1 wherein the weight ratio of said monovinylaromatic monomer and said conjugated diene monomer in steps (2) and (3) is within the range of about 1:0.8 to about 1:1.5.

8. A method according to claim 1 wherein said monovinylaromatic monomer charged in Step (1) is from about 10 to about 65 weight percent of the total weight percent of monovinylaromatic monomer charged in said method; and
   wherein said monovinylaromatic monomer charged in Step (2) is from about 10 to about 30 weight percent of the total weight percent of monovinylaromatic monomer charged in said method; and
   wherein said monovinylaromatic monomer charged in Step (3) is from about 10 to about 30 weight percent of the total weight percent of monovinylaromatic monomer charged in said method.

9. A method according to claim 1 wherein said monovinylaromatic monomer charged in Step (1) is from about 15 to about 65 weight percent of the total weight percent of monovinylaromatic monomer charged in said method; and wherein said monovinylaromatic monomer charged in Step (2) is from about 11 to about 26 weight percent of the total weight percent of monovinylaromatic monomer charged in said method; and wherein said monovinylaromatic monomer charged in Step (3) is from about 11 to about 26 weight percent of the total percent of monovinylaromatic monomer charged in said method.

10. A method according to claim 1 wherein said monovinylaromatic monomer charged in Step (1) is from about 20 to about 60 weight percent of the total weight percent of monovinylaromatic monomer charged in said method; and wherein said monovinylaromatic monomer charged in Step (2) is from about 12 to about 23 weight percent of the total weight percent of monovinylaromatic monomer charged in said method; and wherein said monovinylaromatic monomer charged in Step (3) is from about 12 to about 23 weight percent of the total percent of monovinylaromatic monomer charged in said method.

11. A method according to claim 1
wherein said initiator in step (2) is present in an amount at least equal to the amount of said initiator in step (1); and wherein said initiator in step (3) is present in an amount from about 1.5 to about 5 times greater than said amount in step (2).

12. A method according to claim 1 wherein said conjugated diene monomer is 1,3-butadiene, said monovinylaromatic monomer is styrene, said organomonoalkali metal initiator is n-butyllithium, and said randomizer is tetrahydrofuran.

13. A method according to claim 12 wherein said coupling agent is epoxidized vegetable oil;

wherein the polymerization is carried out in a hydrocarbon diluent;

wherein the polymerization is carried out in a substantial absence of oxygen and water at temperature ranging from −10° C. to 150° C.;

wherein, after said coupling agent reacts with products of said polymerization, the system is treated with a terminating agent and then a stabilizer; and wherein, after termination with said terminating agents, any remaining hydrocarbon diluent is flashed off.

14. A method according to claim 13
wherein said terminating agent comprises water and carbon dioxide; and wherein said stabilizer is chosen from the group of hindered phenols and organophosphites.

15. Polymodal copolymers produced in accordance with the method of claim 1.

16. An article made from the polymer of claim 15.

17. A method according to claim 1 wherein said initiator in step (1) is present in an amount from about 0.005 to about 1.5 parts per 100 parts monomer;

wherein said initiator in step (2) is present in an amount from about 0.005 to about 1.5 parts per 100 parts monomer; and wherein said initiator in step (3) is present in an amount from about 0.01 to about 3.0 parts per 100 parts monomer.

* * * * *